July 23, 1968 L. O. WARD 3,393,656
BOAT STEERING MECHANISM WITH AUTOMATIC ADJUSTMENT
Filed April 24, 1967 3 Sheets-Sheet 1

INVENTOR
LYLE O. WARD
BY: *Allan J. Murray*
ATTORNEY

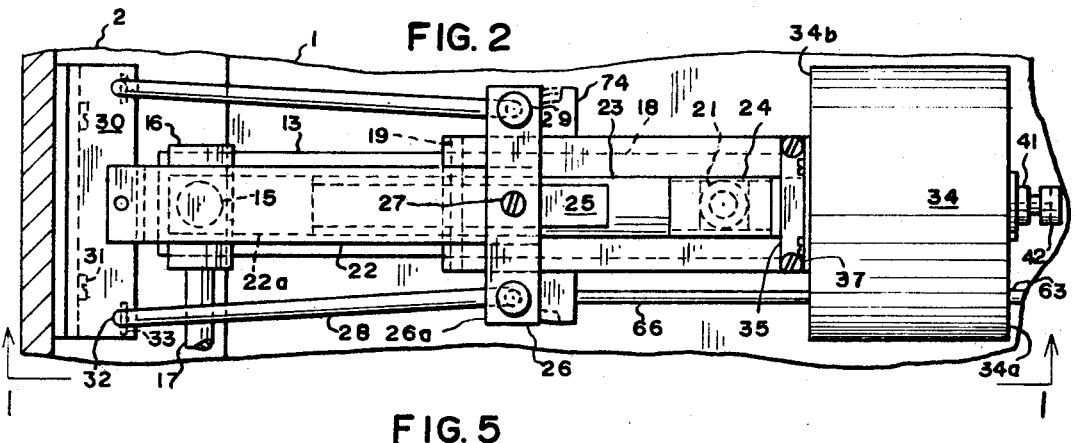
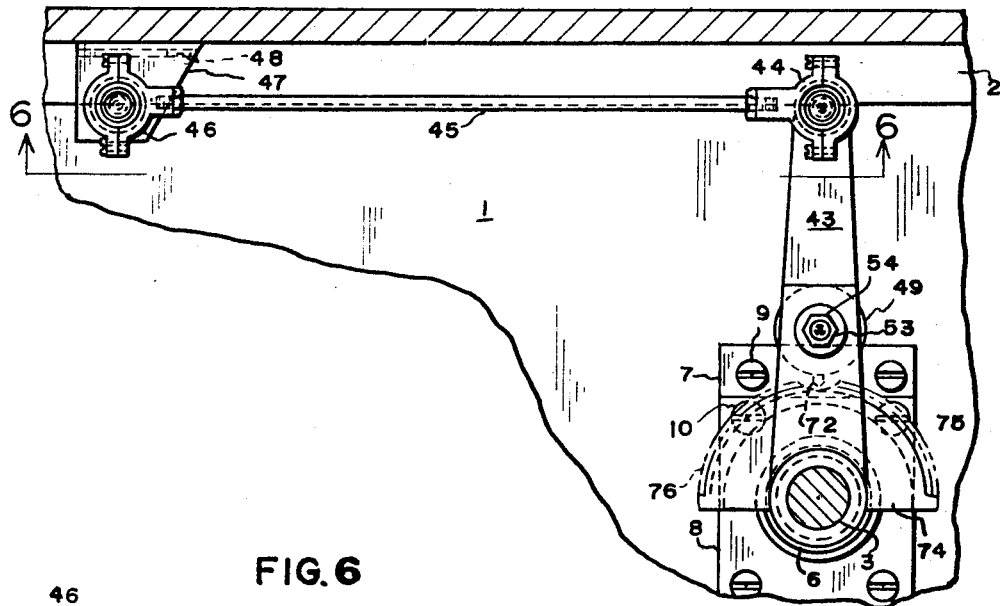
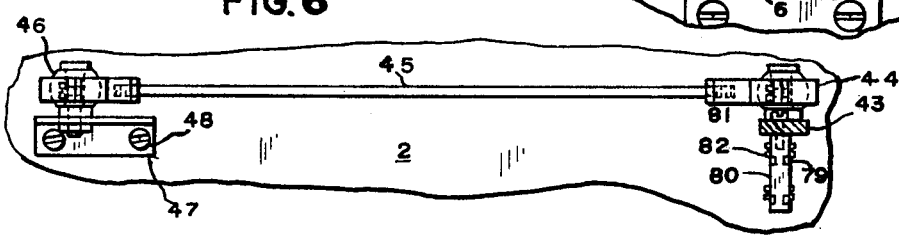

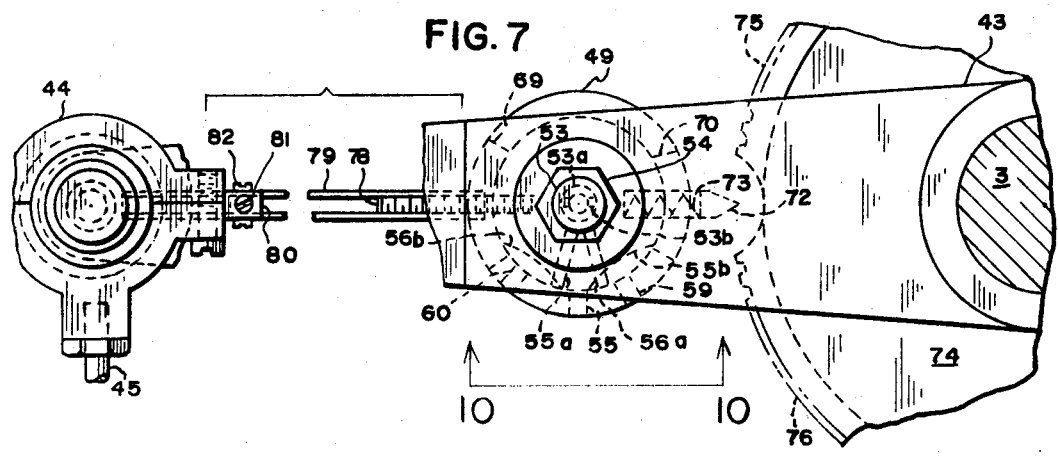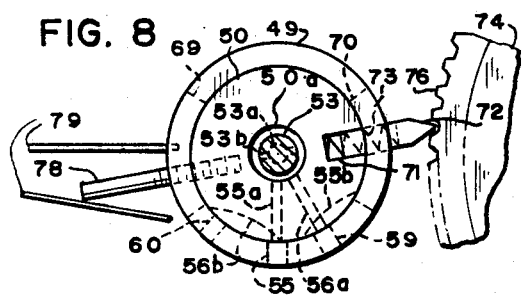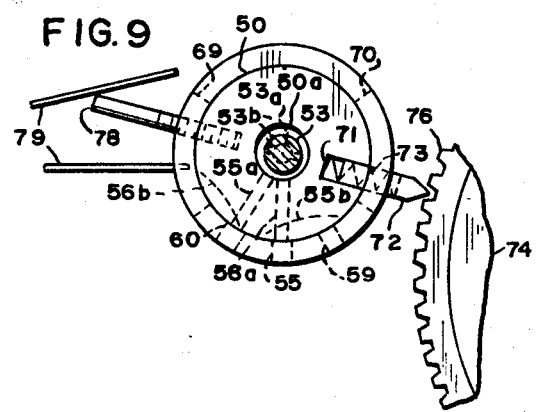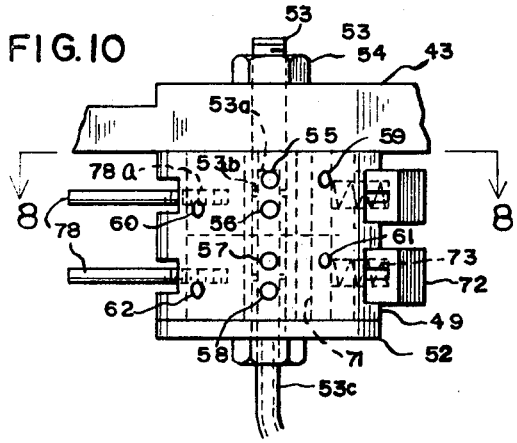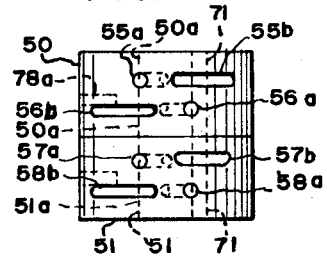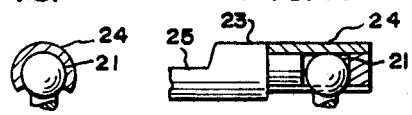
INVENTOR
LYLE O. WARD
BY: Allan J. Murray
ATTORNEY _United States Patent Office_

3,393,656
Patented July 23, 1968

3,393,656
BOAT STEERING MECHANISM WITH
AUTOMATIC ADJUSTMENT
Lyle O. Ward, 615 River St.,
Port Huron, Mich. 48060
Filed Apr. 24, 1967, Ser. No. 632,982
9 Claims. (Cl. 114—144)

ABSTRACT OF THE DISCLOSURE

A steering lever rigidly surmounting a steering post in a boat and engaging a fulcrum. The spacing between the upper end of the steering post and the fulcrum determines the extent of mechanical advantage available to the lever. The steering post is mounted on a universal pivot, and the fulcrum is mounted on a slide carried in a slideway formed on a portion of the lever so that the lever is movable relative to the fulcrum to increase or decrease the spacing, and hence the mechanical advantage. Pneumatic means, operable by the suction of an intake manifold, and controlled by a valve, to automatically adjust said spacing when the steering post is actuated by the lever.

Related application

A part of the ensuing disclosure was disclosed and described in earlier application, Ser. No. 598,857, filed Dec. 7, 1966 in Group No. 315, on a boat steering mechanism. Said application also discloses a pulley and cable means 33, 34 rotatable upon a bracket 32 and acting through connecting rod 16 to effect a steering actuation of the steering post and rudder. It is thought unnecessary to duplicate this disclosure in the present application, as any means of effecting steering actuation may be employed.

Brief summary of invention

This invention relates to mechanisms for steering powered boats, which mechanisms afford an adjustable mechanical advantage derived from a lever mounted upon a steering post and drivable to actuate said steering post about a fulcrum, and this invention relates particularly to devices for automatically increasing or decreasing said mechanical advantage when the steering post is actuated to steer said boat.

An object of the invention is to provide a pneumatic motor engaging said lever and having a piston and piston rod engaging said slide, whereby operation of said pneumatic motor effects a change in the spacing between the upper portion of said steering post and said fulcrum.

A further object of the invention is to provide a conduit from an intake manifold of an engine to said air cylinder, whereby air may be evacuated from said cylinder.

Still another object of the invention is to interpose a valve in said conduit to control the flow of air from and to the cylinder.

Still another object is to provide a valve of the rotary type, and to provide means on the steering post to effect desired rotation of said valve coincident with steering actuation of said steering post so that said valve may be rotated to achieve the desired effect on said pneumatic motor.

Still another object of the invention is to mount a rocker arm upon said post and to further provide means to restrain said rocker arm from rotation of said post.

These and various other objects are attained by the construction hereinafter described and illustrated in the accompanying drawings, wherein:

FIG. 2 is a plan view on line 2—2 of FIG. 1.

FIG. 5 is a fragmentary, horizontal, sectional view on line 5—5 of FIG. 1.

FIG. 6 is a fragmentary, vertical, sectional view on line 6—6 of FIG. 5.

FIG. 7 is an enlarged and more detailed partial view similar to FIG. 5.

FIG. 8 is a fragmentary, horizontal, sectional view on line 8—8 of FIG. 10 showing the valve member in a position to increase the aforesaid mechanical advantage.

FIG. 9 is a view similar to FIG. 8, but showing the valve member in a position to diminish said mechanical advantage as the boat returns to its normal course.

FIG. 10 is a fragmentary elevational view on line 10—10 of FIG. 7 showing only the elements of the valve and a portion of the rocker arm.

FIG. 11 is a view only of substantially duplicate valve body members portraying various valve openings in detail.

FIG. 12 is a fragmentary, vertical sectional view of the fulcrum, taken on line 12—12 of FIG. 1.

FIG. 13 is a fragmentary vertical sectional view of FIG. 12.

Figure 1:
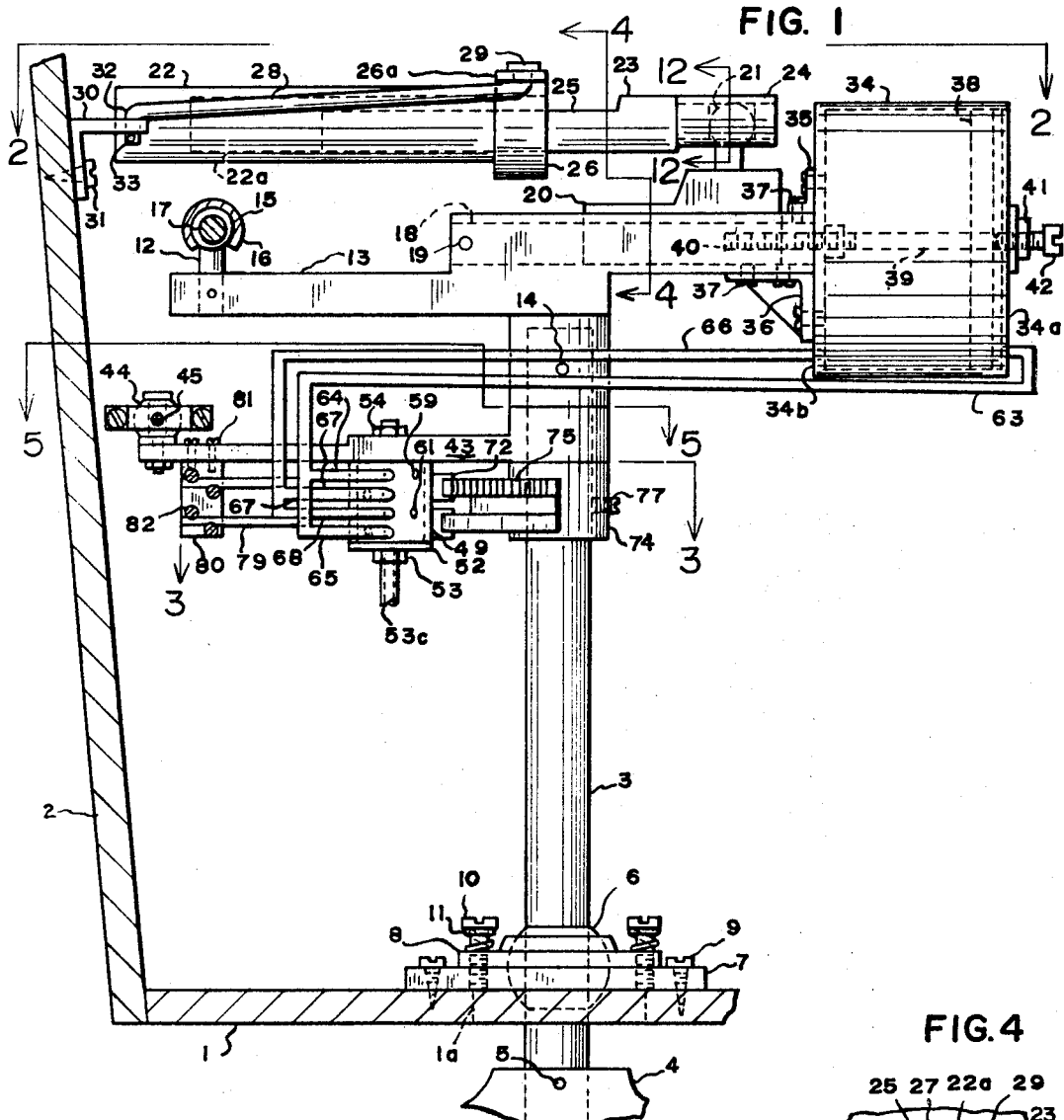
FIG. 1 is a partial, sectional, elevational view on line 1—1 of FIG. 2, showing the steering mechanisms and the means for automatically effecting the aforesaid adjustment.
Figure 3:
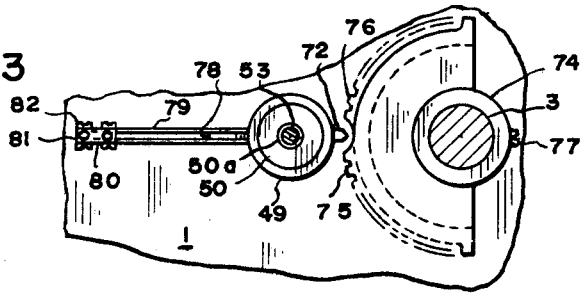
FIG. 3 is a fragmentary, vertical, sectional view on line 3—3 of FIG. 1.
Figure 4:
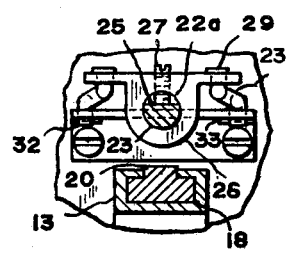
FIG. 4 is a fragmentary, vertical, sectional view on line 4—4 of FIG. 1.

In these views the reference character 1 designates the hull of a boat having a transom 2. A steering post 3 extends through an aperture 1a in the hull of the boat to mount on its lower end portion a rudder 4, secured thereon as by a cross pin 5. A spherical ball 6 is affixed to the rudder post in any convenient manner, and is housed for pivotal and rotational actuation in a spherical socket having its lower portion formed in a rectangular member 7 and its upper portion formed in a rectangular member 8. Screws 9 secure the member 7 to the hull of the boat, while metal screws 10 secure the upper rectangular member 8 to the lower rectangular member 7. It will be noted that springs 11 react between the heads of the screws 10 and the upper surface of the rectangular member 8 to apply a downward pressure to said rectangular member. This arrangement affords adjustment of the tension applied by the springs 11 to attain a desired engagement of the spherical chamber upon the spherical ball 6.

A stub shaft 12 is secured in an end portion of a lever 13, said lever being socketed to receive the upper end portion of the steering post. A pin 14 secures said lever in its position on the steering post. The stub shaft 12 upwardly terminates in a spherical ball 15 which is received in a sleeve 16 and joins with a connecting rod 17, to apply a steering drive to the lever 13 and the steering post 3, much as is disclosed in the aforesaid application, Ser. No. 599,857.

A slideway 18 is formed on the right hand portion of the lever as seen in FIG. 1, and the left end of said slideway is obstructed by a cross pin 19. A slide 20 is received in said slideway, and carries a spherical ball, which serves as a fulcrum 21. A bracket member 22 is socketed at 22a to receive the shank of an elongated bar 23. Outwardly said elongated bar carries an annular sleeve 24 which receives the fulcrum 21, and has its lower portion slotted to afford movement of the spherical ball with respect to said sleeve.

The shank of the elongated bar 23 is formed with a flat 25, which passes through a supporting member 26. Said elongated bar is adjustable longitudinally of the socket 22a and may be releasably secured in any desired position by means of a set screw 27. Tie rods 28 have their headed ends secured in wings 26a integrally extending from said supporting member 26, and are elongated to an angle iron 30 secured as by screws 31 to the transom of the boat. The end portions 32 of said tie rods are bent at approximately right angles to the longitudinal extent thereof, to pass through said angle iron and be secured in position by pins 33.

Mounted at the unobstructed end of the slideway 18 is the cylinder 34 of a pneumatic motor. Upper and lower brackets 35 and 36 are secured to the slideway and to the end wall of the cylinder by screws 37. A piston 38 and piston rod 39 are reciprocatory in said cylinder 34, and it is to be noted that the piston rod extends through the end wall of said cylinder adjacent to said slideway to threadedly engage in said slide. A boss 41, formed on the opposite end wall of said cylinder, is drilled and tapped to receive an adjusting screw 42 which may be turned inwardly or outwardly to control the extent of travel of said piston 38 and piston rod 39.

The post 3 rotatably receives a rocker arm 43. On its outermost end said rocker arm mounts a universal joint 44, which is engaged by means of connecting rod 45 with a second universal joint 46, mounted upon an angle bracket 47 which is in turn mounted to the transom of the boat by screws 48. Disposed beneath said arm is a valve comprising an annular sleeve 49 which rotatably receives an uppper cylindrical valve body 50 and a lower cylindrical valve body 51. A disc 52 provides a bottom wall for the sleeve 49. A hollow bolt 53 formed with a central, longitudinally extending hole 53a and radially extending holes 53b extends upwardly through the two cylindrical valve bodies, and has its upper end portion extending upwardly through the rocker arm 43 to threadedly receive a nut 54 which maintains the described valve in air tight assembly.

As is best seen in FIG. 1, and in FIGS. 7–10, the sleeve 49 is formed with four vertically spaced holes, 55, 56, 57 and 58. Four radially spaced holes, 59, 60, 61 and 62 are associated with the respective vertically spaced holes.

A pipe 63 has an end portion in communication with the interior of the air cylinder 34, through a front end wall 34a, and extends rearwardly of the boat to be formed with a branch 64 communicating with the hole 55, and a branch 65 communicating with the hole 58. A second pipe 66 has an end communicating with the interior of the air cylinder 34, through a rear end wall 34b and extends rearwardly therefrom to be formed with a branch 67 communicating with the hole 56 and a second branch 68 communicating with the hole 57. FIG. 11 shows the upper and lower valve bodies 50 and 51 removed from the sleeve and with other elements eliminated therefrom to clearly display the radially elongated hole 55a and an associated peripheral groove 55b. Further shown in FIG. 11 are a radially directed hole 56a and an associated peripheral groove 56b, a radially directed hole 57a and an associated peripheral groove 57b, and a radially directed hole 58a and an associated peripheral groove 58b. These holes and grooves are associated with the vertically and radially spaced holes in the annular sleeve in a manner to be explained hereinafter.

The annular sleeve 49 is also rearwardly formed with radially elongated apertures 69, and forwardly formed with circumferentially elongated apertures 70. The valve bodies have concentric apertures 50a and 51a to pass the hollow bolt 53 and are further formed with grooves 71 to receive pawls 72 which extend outwardly from said grooves and through said circumferentially elongated apertures 70. Springs 73 urge said pawls to assume their outwardmost position.

A ratchet body 74 is carried by the steering post immediately beneath the rocker arm 43, and is formed with sets of ratchet teeth 75, 76. A set screw 77 is employed to insure that the ratchet body will rotate with the steering post. Threaded pins 78 are received in tapped holes 78a in the respective valve bodies, and extend outwardly and rearwardly through the circumferentially elongated apertures 69. Each said pin is flanked by leaf springs 79 secured to a mounting block 80. Screws 81 secure said mounting block to the rocker arm 43, and screws 82 maintain the position of the leaf springs 79 on said mounting block.

When the steering post 3 is turned clockwise to cause the boat to veer to the left, the set of ratchet teeth 76 engage the uppermost pawl 72 causing it to rotate the upper valve body counterclockwise. As may be seen in FIG. 7, when the upper valve body is in a neutral position, the radial holes 55a and 56a are obstructed by the wall of the annular sleeve 49. However, when the valve body is turned by the action of the ratchet teeth on the pawl, as shown in FIG. 8, the radial hole 55a is aligned with the vertically spaced hole 55, and the peripheral groove 56b affords communication between the radially spaced hole 60 and the vertically spaced hole 56. Further, the radially directed hole 56a is obstructed by the wall of the annular sleeve 49.

In this position, the valve establishes a passage through pipe 63 and the branch 64 thereof, through the holes 55, 55a to the central hole of the upper valve body 50a, and thence through the radial holes 53b to the central longitudinal hole 53a in the bolt 53, and thence through the conduit 53c to the intake manifold of an internal combustion engine (not shown). This of course, tends to evacuate the air on cylinder on the right hand side of the piston as seen in FIG. 1.

A second passage is established through lines 66 and the branch 67 thereof to the hole 56 and the peripheral groove 56b to the hole 60 which affords the admission of air through said communicating holes and pipes to the cylinder on the left hand side of the piston as seen in FIG. 1, so that air may be admitted through said second passage as the piston moves. This condition is maintained throughout the turning of the boat, and it will be noted that the ratchet teeth 76 extend sufficiently far to maintain the position of the valve body through almost 90 degrees of rotation.

As the steering post is rotated counterclockwise, the ratchet teeth 76 move the pawl 72 in a counterclockwise direction, and establish the valve body in the position as shown in FIG. 9. In this position the hole 55a would be obstructed by the wall of the annular sleeve 49, while the hole 56a in the upper valve body 50 would be registered with the hole 56 in the annular sleeve. Further in this position the peripheral groove 55b would provide intercommunication between the hole 55 and 59 in the annular sleeve.

Thus, in this posiiton of the valve body, an air passage would be established through line 66 and its branch line 67, through the hole 56 and 56a to the central hole 50a, through the radial holes 53b and the central longitudinal hole 53a of the hollow bolt 53, and through said conduit 53c to the intake manifold of the engine (not shown). Simultaneously a venting passageway would be established through the hole 59, the peripheral groove 55b, the hole 55, through the branch 64 and the pipe 63 to the air cylinder. Thus affording the evacuation of air from the left side of the piston and the admission of air to the right side of the piston as seen in FIG. 1.

The result to the first position of the valve body would be to draw the piston to the position shown in which there is maximum spacing of the fulcrum 21 and the uppermost portion of the steering post 3, to afford maximum leverage available from said spacing. The result of the second position of the valve body would be to tend to cause the piston to move to the left as seen in FIG. 1. As the piston rod 39 is engaged with the slide 20, and since the fulcrum 21 is rigidly carried by said slide and is restrained from movement by the bracket assembly 22, 23, 24, the obvious result must be that, as the piston and piston rod are unable to move to the left, the piston must therefor move to the right, carrying with it the lever 13, and of course the steering post 3. This has the effect of diminishing the spacing between the fulcrum 21 and the uppermost portion of the lever, to reduce the mechanical advantage available to the lever, since the additional advantage gained while the boat was turning is no longer necessary.

It should be noted that the universal joints 44 and 46 joined by the connecting rod 45, will respond to allow the tilting or canting of the steering post. Such tilting must necessarily result from the fact that it must move relative to two fixed positions established by the pivot 6, 7, 8, and by the fulcum 21. As the steering post must tilt, and rotate on its longitudinal axis, simultaneously, the rotative action engages the ratchet teeth with a pawl, according to the direction of said rotative action, to establish the necessary air passages to affect the air cylinder as desired to increase or diminish the spacing between said fulcrum 21 and the uppermost portion of the steering post 3.

While the action of the lower valve body is the same as that of the upper valve body, for the sake of completeness, there now follows a description of the passageways established by the action of said lower valve body which occurs of course, when the steering post is rotated counterclockwise. The position of the valve body in such case, would be similar to that as shown in FIG. 9. However, in this instance an air passage would be established by the registration of the radially directed hole 58a in the valve body with the vertically spaced hole 58 in the annular sleeve. The peripheral groove 57b would communicate between the radially spaced hole 61, and the vertically spaced hole 57 in the annular sleeve. Thus there is established an air passage through the pipe 63 and the branch 65, the radially spaced hole 58, and the hole 58a, through the central hole 51a, the radial holes 53b, and the central hole 50a in the hollow bolt 53, through the conduit 53c to the aforesaid intake manifold.

Simultaneously, there is established through the pipe 66 and its branch 68, the vertically spaced hole 57, the peripheral groove 57b, and the radially spaced hole 61, an air passage to afford the venting of air to the left side of the cylinder.

Upon turning the steering post to restore the boat to a constant course, again the position of the pawl will be reversed by the ratchet teeth, thus reversing the position of the lower valve to a position substantially analagous to that shown in FIG. 8 for the upper valve body. This would then register the hole 57a with the hole 57 while the peripheral groove 58b would afford communication between holes 58 and 60. The hole 58a would be obstructed by the wall of the annular sleeve 49.

Thus, a passageway would be established through the pipe 66 and the branch 68 to the holes 57 and 57a, and thence to the central hole 51a in the valve body 51, and through the radial holes 53b and the central longitudinal hole 53a of the bolt 53, to the intake manifold through the conduit 53c so that air may be evacuated from the left side of the cylinder. A passageway would also be established to the pipe 63 and the branch 65, the hole 58, the peripheral groove 58b, and the hole 62 to afford admission of air to the right hand side of the cylinder.

What I claim is:

1. The combination with a boat having a hull, an engine with means to compel an airflow, a steering post, a rudder rigidly carried by said post, pivot means mounting the post for rotative and pivotal steering action, a lever rigidly carried by said post to drive said post in said travel, actuating means effective upon said lever to transmit said drive, a slideway formed on said lever, a slide received on said slideway, a fulcrum rigidly carried by the slide, and means securing said fulcrum to said hull to afford swinging travel of the lever about said fulcrum concurrent with said steering action, of means to automatically move the post, about said pivot, to or from said fulcrum by sliding said lever relative to said slide to vary the mechanical advantage available to said lever, said means including,
a drive interconnecting said slide and said lever, and operable to react between said elements to move the post to and from said fulcrum,
energizing means to reversibly operate said drive,
a control device to predetermine the direction of movement of said post,
an actuator to actuate said control device responsive to steering action to increase said mechanical advantage while turning the boat from a constant route, and to reduce said advantage when resuming a constant route.

2. The combination as set forth in claim 1, said drive including a cylinder rigidly mounted upon the lever,
a piston reciprocatory in said cylinder,
a piston rod extending from said cylinder to rigidly engage said slide, whereby actuation of the piston effects said reaction of the lever causing said lever to move to or from the fulcrum.

3. The combination as set forth in claim 2, said energizing means including air conduits having respective end portions communicating with respective end portions of said cylinder to evacuate air from one side of said piston and admit air to the other side thereof,
said control means being a valve, adapted to direct the flow of air through said conduits to obtain a desired action of said piston.

4. The combination as set forth in claim 3, said valve including an annular sleeve,
a cylindrical body received in said sleeve,
respective first sets of apertures formed in said sleeve, the opposite end portions of said conduits communicating with some of said apertures,
respective second sets of apertures formed in said cylindrical body for selective registration with the respective sets of first apertures upon rotation of said body to effect desired piston travel,
a central aperture communicating with said second sets of apertures and further communicating with said intake manifold to effect said evacuation and admission of air,
means predeterminedly adapted to cause rotation of the cylindrical body to effect registration of desired respective second sets of apertures with appropriate respective first sets of apertures to effect a desired travel of the piston.

5. The combination as set forth in claim 4, said last mentioned means including,
a pawl carried by said body, said body being adapted to receive said pawl,
a radially elongated aperture formed in said sleeve, and said pawl extending through said aperture,
a ratchet rigidly mounted upon the post for rotative travel therewith,
spring means housed in said cylindrical body and urging said pawl into engagement with the teeth of said ratchet, whereby rotation of the ratchet with the post causes rotation of the pawl and cylindrical body within said sleeve to effect said predetermined registration of said apertures, and
tensioning means to yieldably resist said rotation of said cylindrical body and urge it to a neutral position, means on said body to engage said tensioning means.

6. The combination as set forth in claim 5,
said tensioning means being springs,
an elongated rod protruding from said body and engaged by said springs,
a radially elongated aperture in said sleeve to accommodate said rod.

7. The combination as set forth in claim 3,
a pair of cylindrical bodies received in said sleeve for independent rotation therein,
respective first sets of apertures formed in said sleeve, the opposite end portions of said conduits communicating with some of said apertures, respective second sets of apertures formed in said cylindrical bodies for selective registration with the respective sets of first apertures upon rotation of said body to effect desired piston travel, a central aperture communicating with said second sets of apertures and further communicating with said intake manifold to effect said evacuation and admission of air, respective means predeterminedly adapted to cause rotation of the respective cylindrical bodies to effect registration of desired respective second sets of apertures to effect a desired travel of the piston.

8. The combination as set forth in claim 7, said last mentioned means including a respective pawl carried by each respective cylindrical body, each said body being adapted to receive said pawls, radially elongated apertures formed in said sleeve, and each said pawl extending through one of said apertures, a ratchet rigidly mounted upon the post for rotative travel therewith, spring means housed in said cylindrical bodies to urge said pawls into engagement with the teeth of said ratchet, whereby rotation of said ratchet with the post causes rotation of one of said pawls and cylindrical body to effect said predetermined registration of said apertures, and tensioning means to yieldably resist rotation of said cylindrical bodies and urge it to a neutral position, means on said body to engage said tensioning means.

9. The combination as set forth in claim 8, said tensioning means being springs, an elongated rod protruding from each cylindrical body, radially elongated apertures in said sleeve to accommodate said rods.

References Cited

UNITED STATES PATENTS 3,080,953   3/1963   Edgemond _____ 114—144

ANDREW H. FARRELL, *Primary Examiner.*